March 4, 1969     H. J. HOMRIG     3,430,801

CLOSURE FOR A HIGH PRESSURE VESSEL

Filed Feb. 12, 1968

INVENTOR
HORACE J. HOMRIG

BY Burns, Doane, Benedict,
Swecker & Mathis

ATTORNEYS

United States Patent Office 3,430,801
Patented Mar. 4, 1969

3,430,801
CLOSURE FOR A HIGH PRESSURE VESSEL
Horace J. Homrig, Duncan, Okla., assignor to Halliburton Company, Duncan, Okla., a corporation of Delaware
Filed Feb. 12, 1968, Ser. No. 704,703
U.S. Cl. 220—46                    7 Claims
Int. Cl. B65d 53/04, 39/08

ABSTRACT OF THE DISCLOSURE

A closure for a vessel of the type adapted to contain fluid under high pressure and which includes an edge defining an opening in the vessel. The closure includes an axially extending closure body having a body shoulder. A movable follower, mounted coaxially in the body, includes a follower shoulder in axially spaced, opposed relation to the body shoulder. The shoulders are urged relatively together by high pressure fluid acting on a pressure responsive surface provided on the follower. A seal extends peripherally around the follower between the shoulders. The seal includes a channel member of substantially incompressible material having a predetermined elastic limit. The seal also includes a wedging member extending partially into the channel member. The seal and channel members include deforming means for deforming the channel member into sealing relation with the follower and the edge of the vessel opening upon relative approaching motion of the members. A limiting means is connected with at least one of the members for limiting their approaching motion to a predetermined amount, determined by the yield strength of the material, so as to limit deformation of the channel member up to but not beyond the elastic limit of the material.

BACKGROUND OF INVENTION

This invention relates to a closure for a vessel of the type adapted to contain fluid under high pressure and in particular to a closure of the type having a seal of incompressible material adapted to be reusably applied to the vessel.

In providing a seal between a closure for a pressure vessel and the portions of the vessel adjacent the closure, it has been common for many years to utilize compressible seal materials, such as rubber, which are deformed into sealing contact between the vessel and the closure. However, at very high pressures of up to 50,000 pounds per square inch or so, compressible seal materials become distorted to such a degree as to become incapable of retaining their sealing qualities, with the result that compressible seal materials can no longer be used for high pressures of the order indicated.

For these high pressures, it has become necessary to utilize seal rings of substantially incompressible material such as steel, shaped to be resiliently deformed to provide a sealing action. At least one prior closure of this type includes an axially extending closure body mounted in an opening of the vessel with a coaxial follower mounted for motion axially of the closure body. A seal comprising two steel rings having cooperating wedging surfaces is mounted between cooperating wedging surfaces on the closure body and the follower. The high pressure fluid urges the follower toward the closure body so that the wedging action of the steel rings causes them to be resiliently deformed into sealing contact between the follower and the vessel. In the known prior device, preloading screws are also provided for initially moving the follower toward the closure body to cause an initial expansion of the sealing rings into sealing contact with the vessel body.

Although prior closures of the type described are generally adequate, they may sometimes prove unsatisfactory for a number of reasons. For example, if the pressure is particularly high, the relative wedging action of the two seal rings may continue unchecked until one or both of them becomes stressed beyond its elastic limit, thus causing permanent deformation. If this occurs it will not be possible to reuse the permanently deformed seal ring upon a later reclosure of the vessel, as it will have lost its resilient sealing properties. It would therefore be desirable to insure that overstressing of the seal material beyond its elastic limit is prevented.

Another disadvantage of the previously described prior structure resides in the provision of the cooperating axially inclined wedging surfaces on the follower and vessel body. Providing these special surfaces may make the vessel and follower more expensive than one having surfaces lying only in simple axial and radial planes. To reduce manufacturing costs it would be desirable if the necessary inclined wedging surfaces could be incorporated into the structure of the seal itself.

SUMMARY OF INVENTION

It is therefore a general object of the invention to provide a closure for a vessel of the type adapted to contain fluids at high pressures (of up to 50,000 pounds per square inch or the like) intended to obviate or minimize disadvantages of the sort previously noted.

It is a particular object of the invention to provide a closure for a pressure vessel having a reusable seal of substantially incompressible seal material but shaped for limited elastic deformation, so designed that the possibility of overstressing of any portions of the seal beyond the elastic limit of the seal material is effectively minimized.

It is a further object of the invention to provide a closure for a high pressure vessel of the type having a resilient seal of incompressible material, which may be constructed without any need to provide special inclined wedging surfaces on the vessel body or closure body for the purpose of expanding the seal.

A preferred embodiment of the invention intended to accomplish at least some of the foregoing objects comprises a closure for a vessel of the type adapted to contain fluid under high pressure and having an edge defining an opening in the vessel. The closure includes an axially extending closure body provided with a transversely extending body shoulder. A follower mounted coaxially in the body for relative motion axially thereof includes a transversely extending, follower shoulder in axially spaced, opposed relation to the body shoulder. The follower shoulder is urged towards the body shoulder by fluid pressure acting on a pressure responsive surface provided on the follower. A seal, extending peripherally around the follower, includes a channel member formed of a substantially incompressible material having limited elasticity. The seal also includes a wedging member extending partially into the channel member. The wedging member contacts one of the shoulders and the channel member the other. The channel and wedging member includes deforming means for deforming the channel member into sealing contact with the follower and the edge of the vessel opening upon relative approaching motion of the members. Limiting means is connected with at least one of the members for limiting relative approaching motion of them to a predetermined amount determined by the yield strength of the material of which the channel member is formed, to limit deformation of the channel member up to but not beyond the elastic limit of the material.

In another aspect of the invention the closure is additionally provided with preloading means connected with the closure body for causing relative axial motion between the body and the follower, irrespective of pressure existing in the vessel, to cause initial deformation of the channel member into sealing contact between the follower and the edge of the vessel opening.

Also significant is the provision of fluid passage means in the seal and in the follower adapted to place the high pressure fluid in fluid communication with an interior space in the channel member, to directly augment the sealing effect.

THE DRAWINGS

A preferred embodiment of the invention is illustrated in the accompanying drawings in which.

DETAILED DESCRIPTION

General summary

Figure 1:
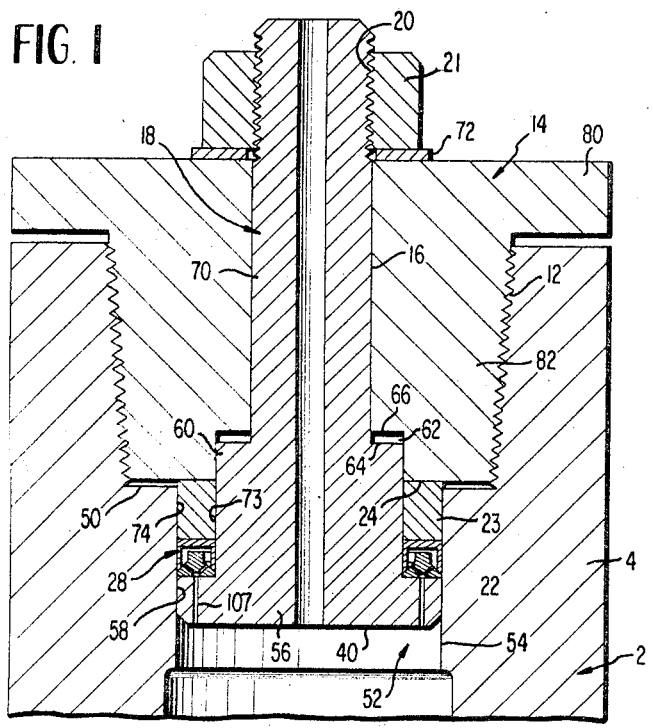
FIGURE 1 is a cross-sectional side view of a closure for a vessel adapted to contain fluid under high pressure, according to a preferred embodiment of the present invention.

Referring to FIGURE 1 of the drawings, a closure for a high pressure vessel according to a preferred embodiment of the invention is there shown.

The apparatus includes a vessel 2 comprising an axially extending cylinder 4 having an internal bore 6 containing fluid under high pressure. The vessel has a closed lower end 8 and a threaded, open upper end 12 receiving a correspondingly threaded closure body 14. Extending axially through the closure body 14 is a bore 16.

An axially extending follower 18 is received slidably in the bore 16 and is provided with a threaded portion 20 which extends above the closure body and engages a nut 21 abutting the closure body. By turning the nut 21, the follower 18 may be moved axially of the closure body. Adjacent its lower end, the follower 18 includes a flat, radially extending, upwardly facing follower shoulder 22 spaced below a downwardly facing, flat, lower radial face 23 provided on the bottom of the closure body 14. An annular load ring 23 extends about the follower 18 and has an upper radial surface 24 contacting the lower face 22 of the closure body 14. A lower radial face of the load ring constituting a body shoulder 25, is disposed in spaced opposed relation above the follower shoulder 20.

Positioned between the follower and body shoulders 22 and 25 is a composite seal unit 28. The composite seal 28 (FIGURE 2) includes an annular channel member 30 extending peripherally about the follower 18. The channel member 30 is of downwardly directed, generally U-shaped cross section, having axially extending inner and outer walls 32 and 34 facing respectively toward the follower 18 and the vessel wall 2, and disposed in loose, sliding contact therewith in an unloaded condition of the seal. A radially extending, intermediate wall 36 connected to the upper ends of the inner and outer walls 32 and 34 abuts the adjacent body shoulder 25 of the loading ring 23.

Projecting into the channel member is a coextensive annular wedging member 38 having inclined wedging surfaces slidably engaging corresponding wedging surfaces on the free extremities of the inner and outer walls 32 and 34. The various wedging surfaces constitute deforming means for deforming the channel member in a manner to be described. The wedging member is in contact with the follower shoulder 22.

When the fluid under high pressure is present in the vessel, it acts upon a flat, lower radial surface 40 (FIGURE 1) of the follower 18 to urge the follower 18 upwardly through the closure body 14, thus exerting compressive force upon the seal unit 28 positioned between the closure and follower shoulders 25 and 22 respectively. This causes relative approaching motion of the channel and wedging members 30 and 38 with the result that the wedging surfaces force the inner and outer walls 32 and 34 firmly into contact with the adjacent portions of the follower and the interior of the vessel respectively, to provide a sealing action therebetween.

In a particular aspect of the invention, the channel member 30 is protected against being deformed beyond the elastic limit of the material from which it is formed. This is achieved by providing an axially extending projection 42 on the upper surface of the wedging member 38. The projection 42 is spaced a predetermined distance below the intermediate wall 36 of the channel member when the latter is in an initial unloaded condition. The predetermined spacing is such as to permit relative approaching motion of the members only up to a point when the deformation of the channel member closely approaches but does not exceed the elastic limit of the material from which the channel member is formed. Thereafter the projection abuts the channel member to prevent further closing motion. In this way, the possibility of overstressing of the channel member, which might ruin its sealing properties and prevent reuse of the channel member is minimized.

Detailed structure

The previously mentioned high pressure vessel 2 (FIGURE 1) is of the type described in more detail in the copending application of applicant and another, Ser. No. 599,870, filed Dec. 7, 1966, for "Closure Assembly for High Pressure, High Temperature Vessels," to which reference should be made for further details of the construction of the vessel 2. Spaced below its upper end the vessel 2 includes a horizontal, radially extending, flat face 50 extending inwardly from the lower end of the previously mentioned threaded, open upper end portion 12. Extending downwardly from the radial face 50 is an upper region 52 of the bore 6, defined by an axially extending, cylindrical interior wall 54 of uniform diameter.

Received in the upper region 52 of the bore 6 is a lower portion 56 of the previously mentioned follower 18. The lower portion 56 includes an axially extending peripheral face 58 of generally the same diameter as interior wall 54 in sliding abutting contact therewith. The previously mentioned, pressure responsive face 40 constitutes the lower surface of the lower portion 56 of the follower 18. Spaced axially above and parallel to the lower surface 40 is a peripherally extending, flat radial surface constituting the previously mentioned follower shoulder 22.

An intermediate cylindrical portion 60 of the follower 18 integral and concentric with the lower portion 56, extending upwardly therefrom, is spaced radially inwardly of the adjacent cylinder wall 54. At its upper end the intermediate portion 60 is slidably and snugly received within a correspondingly shaped, cylindrical bore 62 extending axially for a short distance upwardly into the previously mentioned closure body 14. The intermediate portion 60 and the bore 62 are provided with opposed, radially extending, flat shoulders 64 and 66 respectively which move into abutting contact in the unlikely event of complete collapse of the seal 28, to limit upward movement of the follower 18 relative to the closure body 14.

The follower 18 also includes a cylindrical main portion 70 integral and concentric with the intermediate portion 60 extending upwardly and through the closure body 14. The main portion 70 is provided with the previously mentioned threaded end 20 engaged by the nut 22. A washer 72 is desirably interposed between the nut 22 and the upper surface of the closure body to prevent damage thereto. The nut 22 provides for preloading of the seal 28 in a manner to be described hereinafter.

The previously mentioned closure body 14 includes a uniformly thick, axially extending, circular flange 80 provided with a downwarly projecting, concentric, integral body 82. The body 82 is threaded about its periphery to matingly engage the previously mentioned threaded open end 12 of the high pressure vessel 2. At its lower end the body 82 is provided with the previously mentioned flat, radially extending surface 23 spaced axially a short distance above the radial interior surface 50 of the vessel.

When the vessel is unloaded, the closure body 14 may be unthreaded from the vessel to provide access to the interior thereof. After the closure body 14 is removed, the nut 22 retains the follower 18, load ring 23 and the seal unit 28 with the closure body as a unitary closure assembly.

The previously mentioned load ring 23 also includes inner and outer, axially extending peripheral surfaces 73 and 74 contacting the intermediate portion 60 of the follower and the cylinder wall 54 of the bore respectively. The loading ring 23 is of incompressible material and locates the seal 28 in fixed relation to the lower face 23 of the closure body 14 in load transmitting relation therewith, at a position spaced axially below the radial surface 50.

Figure 3:
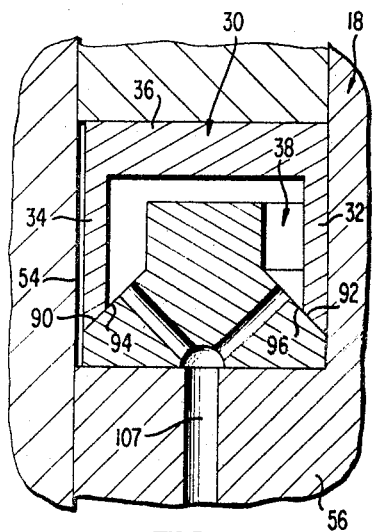
FIGURE 3 is a cross-sectional view on an enlarged scale of a portion of the seal shown in FIGURE 2 taken along the line 3—3 therein with the seal shown in an unloaded condition.

The previously described seal 28 includes the channel member 30 provided with the inner and outer walls 32 and 34 and the transverse intermediate wall 36, each of the walls being of generally rectangular cross section. At their lower extremities the outer and inner walls 34 and 32 are provided with wedging surfaces 90 and 92 respectively (FIGURE 3) inclined downwardly in opposite radially diverging directions at about 45°. The wedging surfaces 90 and 92 engage respective, correspondingly inclined, outer and inner wedging surfaces 94 and 96 provided on the upper surface of the previously mentioned, wedging member 38. When the channel and wedging members 30 and 38 are moved relatively axially together, the various cooperating wedging surfaces 90–96 function as deforming means operable to cause the inner and outer walls 32 and 34 of the channel member to be deformed, i.e., moved relatively radially apart into sealing contact with adjacent portions of the follower 18 and cylinder wall 54 respectively.

In operation, such relative motion is caused by the pressure acting on the lower pressure responsive surface 40 of the follower 18, urging the latter upwardly through the stationary closure body 14, thus causing relative approaching motion between the follower and body shoulders 22 and 25 respectively. During seal engagement, the lower portions of the inner and outer walls 32 and 34 will move first into contact with the respective adjacent portions of the follower and cylinder bore. However, as the pressure continues to build up the channel member 30 becomes resiliently bowed to bring the inner and outer walls 32 and 34 into sealing contact along substantially the full axial extent of the inner and outer walls against the respective adjacent portions of the follower and bore.

Figure 4:
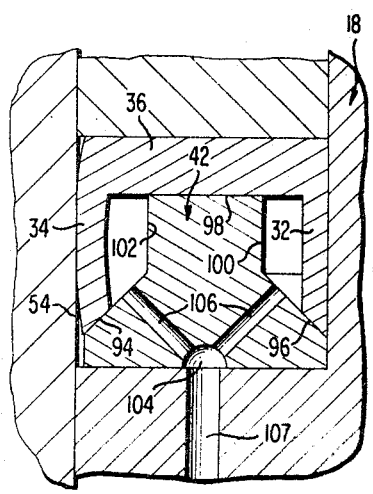
FIGURE 4 is a cross-sectional view of a portion of the seal shown in FIGURE 2 taken along the line 4—4 therein with the seal shown in a fully loaded condition.

If, however, resilient deformation of the channel member 30 should be allowed to continue to a point beyond that at which the elastic limit of the material would be exceeded, the channel member 30 would receive a permanent enlargement rendering it unsuitable for reuse. To avoid this possibility the previously mentioned limiting projection 42 (FIGURE 4) is provided. The projection 42 is of generally rectangular cross section including a flat, radially extending upper surface 98 and downwardly axially extending inner and outer side surfaces 100 and 102 respectively. The projection 42 is integral with the remainder of the wedging member 38 and the side surfaces 100 and 102 at their respective lower edges intersect and blend with the previously mentioned inclined wedging surfaces 96 and 94 respectively.

In an unloaded condition of the composite seal 28, the lower surface of the intermediate wall 36 is spaced a predetermined distance axially above the surface 98 of the projection 42. However, under load, as the channel member becomes deformed in the manner previously described, the intermediate wall 36 and the projection 42 approach each other and finally come into limiting contact when the channel member 30 has become deformed to a degree at which the elastic limit of the channel member material is closely approached but not exceeded. Thereafter, further deformation of the channel member 30 is prevented by the supporting action of the projection 42 which is of incompressible material.

It will be appreciated in this manner that overstressing of the material of the channel member beyond its elastic limit is prevented so that the composite seal may continue to be reused on subsequent openings and closures of the pressure vessel 2.

Figure 2:
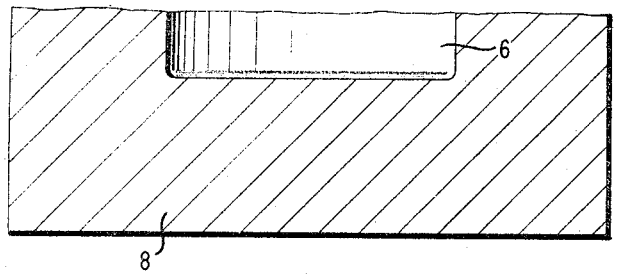
FIGURE 2 is a perspective view partially broken away of a seal forming a part of the closure shown in FIGURE 1.

In order to assist the sealing action of the channel member 30, the high pressure of the fluid contained within the vessel 2 is utilized to directly act upon the interior surfaces of the walls 32 and 34 to urge them outwardly to increase the seal. For this purpose, a peripherally extending, downwardly facing groove 104 (FIGURE 4) is provided on the lower surface of the wedging member 38 disposed generally centrally thereof. Communicating with the groove 104 are a plurality of peripherally spaced pairs of inclined ports 106 (FIGURE 2). Each pair of ports 106 (FIGURE 4) extends upwardly and outwardly from the groove 104 on opposite sides thereof to a point adjacent the intersection of the junction of the adjacent wedging surfaces 94 and 96 with the respective adjacent side surfaces 102 and 100 of the projection 42. A plurality of peripherally spaced, axially extending passages 107 in the lower portion 56 of the follower 18 place the groove 104 in fluid communication with the high pressure fluid acting on the lower, pressure responsive surface 40 of the follower. In this way the high fluid pressure is communicated to an interior space within the seal 28, defined by the interior wall portions thereof, to act on the walls 32 and 34 urging them relatively apart to increase the sealing effect.

*Operation*

In operation with the vessel 2 in an initially unloaded condition, the closure body 14 is threadedly engaged with the threaded open end 12 of the vessel 2. The nut 21 is then rotated to cause the follower 18 to move upwardly of the closure body 14. This causes relative approaching motion between the channel member 30 and the wedging member 38 to provide an initial expansion of the inner and outer walls 32 and 34 of the composite seal 28 into contact with the follower 18 and the interior cylinder wall 54. The nut 21 continues to be tightened until a desired degree of preloading of the seal has been achieved. Thereafter, pressure is allowed to increase to the desired amount within the cylinder 2 so that pressure acting on the pressure responsive surface 40 increases the degree of resilient deformation of the channel member 30 to increase the sealing effect. The seal is further augmented by the effect of pressure acting directly through the passages 104, 106 and 107 to the interior of the seal. If the pressure within the cylinder increases to such an extent that deformation of the seal threatents to increase to a point such as to overstress the seal, the intermediate wall 36 moves into contact with the projection 42 to limit further deformation of the channel member 30, preventing overstressing thereof.

SUMMARY OF ADVANTAGES

It will be seen that in following the present invention, a closure which is particularly effective for use in conjunction with high pressure vessels is provided.

Of particular significance is the provision of limiting portions to prevent resilient deformation of the seal to a degree exceeding the elastic limit of the seal material. In this manner the closure is maintained in reusable condition without requiring replacement of the composite seal in the event of occasional overpressure conditions.

Also of importance in this connection is the provision of ports placing fluid under high pressure in fluid communication with the interior of the composite seal to directly assist the sealing action of the seal walls.

Other advantages are provided by the preloading nut engaged with the follower which permits the seal to be expanded into sealing configuration before the vessel is filled with fluid under high pressure; and by the opposed shoulders on the intermediate portion of the follower and on the closure body for limiting relative movement apart of the follower and body in the unlikely event of total seal collapse.

Although the invention has been described with reference to one preferred embodiment, it will be appreciated by those skilled in the art that additions, modifications, substitutions, deletions and other changes not specifically described may be made which will fall within the spirit of the invention embraced in the following claims.

I claim:

1. A closure for a vessel of the type adapted to contain fluid under high pressure and having an edge defining an opening in the vessel, the closure comprising:
   an axially and transversely extending closure body including:
   a transversely extending body shoulder;
   a follower mounted coaxially in said body for relative motion axially thereof, said follower including:
      a transversely extending follower shoulder spaced axially from said body shoulder in opposed relation thereto, a pressure responsive surface adapted to be acted upon by the high pressure fluid to urge said follower shoulder towards said body shoulder;
   a seal extending peripherally around said follower, said seal including:
      a channel member formed of substantially incompressible material having a predetermined elastic limit,
      a wedging member extending partially into said channel member, said wedging member contacting one of said shoulders and said channel member contacting the other of said shoulders,
   said channel and wedging members further including:
      deforming means for causing said channel member to be deformed into sealing contact with said follower and the edge of the opening upon relative approaching motion of said members; and
      limiting means, independent of said deforming means, connected with at least one of said members for limiting relative approaching motion thereof to a predetermined amount determined by the yield strength of the material of which said channel member is formed, up to but not beyond the elastic limit of said material.

2. A closure as defined in claim 1 wherein said channel member further includes:
   opposed inner and outer walls contacting said follower and adapted to contact the edge of the vessel opening respectively, and
   an intermediate wall secured to and extending between said inner and outer walls and in contact with said other of said shoulders,
   said wedging member extending between and contacting said inner and outer walls,
   said deforming means further including:
      at least one pair of cooperating wedging surfaces on said wedging member and at least one of said walls at the point of contact thereof.

3. A closure as defined in claim 2 wherein: said intermediate wall includes:
   an inner surface facing toward said wedging member,
   said limiting means including:
      a projection fixed to said wedging member extending axially toward said inner surface of said intermediate wall of said channel member, said projection being independent of and spaced apart from said wedging surfaces adjacent portions of said projection and said inner surface being spaced apart a predetermined amount when said seal is unloaded, said inner surface and adjacent portions of said projection moving into abutting contact when said channel member is deformed to a level closely adjacent but not exceeding the elastic limit of said material of said channel member.

4. A closure as defined in claim 2 further including: fluid passage means in said seal and in said follower adapted to place the high pressure fluid in fluid communication with an interior space between said inner and outer walls to urge said walls relatively apart.

5. A closure as defined in claim 2 further including: preloading means connected with said body for causing relative axial motion between said body and said follower to cause said walls of said channel member to be moved apart into sealing contact between said follower and the edge of the vessel opening.

6. A closure as defined in claim 2 wherein:
   said closure body and said follower are cylindrical and concentric,
   said body and follower shoulders being generally flat and radially extending with said channel member and said wedging member having a composite, generally rectangular cross-sectional profile.

7. A closure for a vessel of the type adapted to contain fluid under high pressure and having an edge defining an opening in the vessel, the closure comprising:
   an axially and transversely extending closure body including:
      a transversely extending body shoulder;
   a follower mounted coaxially in said body for relative motion axially thereof, said follower including:
      a transversely extending follower shoulder spaced axially from said body shoulder in opposed relation thereto,
      a pressure responsive surface adapted to be acted upon by the high pressure fluid to urge said follower shoulder towards said body shoulder;
   a seal extending peripherally around said follower, said seal including:
      a channel member formed of substantially incompressible material having a predetermined elastic limit,
      a wedging member extending partially into said channel member, said wedging member contacting one of said shoulders and said channel member contacting the other of said shoulders,
   said channel member further including:
      opposed inner and outer walls contacting said follower and adapted to contact the edge of the vessel opening respectively,
      an intermediate wall secured to and extending between said inner and outer walls and in contact with said other of said shoulders,
      said wedging member extending between and contacting said inner and outer walls;
   at least one pair of cooperating wedging surfaces on said wedging member and at least one of said inner and outer walls at the point of contact thereof with said wedging member,
   limiting means connected with at least one of said members for limiting relative approaching motion thereof to a predetermined amount determined by the yield strength of the material of which said channel member is formed, up to but not beyond the elastic limit of said material, at least one axially extending passage in said follower extending between and intersecting said pressure responsive surface and said follower shoulder; and at least one fluid port in said wedging member in fluid communication with said one passage in said follower and with an interior space in said channel member defined by the interior surfaces of said inner, outer and intermediate walls.

References Cited
UNITED STATES PATENTS 2,016,226   10/1935   Clausen _____ 220—46
2,305,589   12/1942   Stark _____ 220—46

GEORGE E. LOWRENCE, *Primary Examiner.*